United States Patent
Relan

(10) Patent No.: US 7,756,921 B2
(45) Date of Patent: Jul. 13, 2010

(54) PROGRAMMABLE PACKET FIELD REPLACEMENT BASED ON A RANGE TECHNIQUE

(75) Inventor: Sandeep Relan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 2386 days.

(21) Appl. No.: 10/317,170

(22) Filed: Dec. 12, 2002

(65) Prior Publication Data

US 2003/0177257 A1    Sep. 18, 2003

Related U.S. Application Data

(60) Provisional application No. 60/364,599, filed on Mar. 18, 2002.

(51) Int. Cl.
*G06F 15/16* (2006.01)
(52) U.S. Cl. .................. 709/203; 709/236; 709/238
(58) Field of Classification Search .............. 709/236, 709/238, 203; 370/389
See application file for complete search history.

(56) References Cited

U.S. PATENT DOCUMENTS

| | | | |
|---|---|---|---|
| 5,898,687 A | 4/1999 | Harriman et al. | |
| 5,951,651 A | 9/1999 | Lakshman et al. | |
| 6,173,384 B1 | 1/2001 | Weaver | |
| 6,252,872 B1 * | 6/2001 | Tzeng | 370/360 |
| 6,289,013 B1 | 9/2001 | Lakshman et al. | |
| 6,628,653 B1 * | 9/2003 | Salim | 370/389 |
| 6,735,264 B2 * | 5/2004 | Miller | 375/340 |
| 6,772,223 B1 * | 8/2004 | Corl et al. | 709/238 |

* cited by examiner

*Primary Examiner*—John Follansbee
*Assistant Examiner*—Glenford Madamba

(57) ABSTRACT

A network component for processing a packet includes at least one first storage unit, at least one second storage unit, at least one third storage unit, and an action implementation unit. The at least one first storage unit is configured to store an initial bit value selected from within the packet. The at least one second storage unit is configured to store a bit action length value. The at least one third storage unit is configured to store an extracted bit value based upon the initial bit value and the bit action length value. The action implementation unit is configured to implement at least one action on a packet by using an action bit value to modify the extracted bit value.

12 Claims, 8 Drawing Sheets

PROGRAMMABLE PACKET FIELD REPLACEMENT BASED ON A RANGE TECHNIQUE

CROSS-REFERENCE TO RELATED APPLICATIONS

This application claims priority of U.S. Provisional Patent Application Ser. No. 60/364,599, filed Mar. 18, 2002. The subject matter of the earlier filed application is hereby incorporated by reference.

BACKGROUND OF THE INVENTION

1. Field of the Invention

The present invention relates to a method and an apparatus for high performance packet filtering in a communication network environment such as token ring, ATM, Ethernet, Fast Ethernet, Gigabit Ethernet and 10 Gigabit Ethernet or any other networking environment. In particular, the present invention relates to a packet filter and a method for filtering a packet that can be implemented in a network component, which may include discrete devices or which may be implemented on a semiconductor substrate such as a silicon chip.

2. Description of the Related Art

In networking applications, an incoming packet enters an ingress port of a network component, such as a switch. The network component processes the incoming packet and directs it to an egress port. In processing the incoming packet, the network component can examine the incoming packet on the ingress side, and can determine addressing and routing information to enhance network performance.

The network component can apply various pre-defined addressing and processing logic to the incoming packet, when examining the incoming packet on the ingress side therein. However if a customer wishes to have an action, which is not currently defined within the pre-defined actions table, performed on an incoming packet, the switch designer may have to redesigned or reconfigure the switch in order to add the newly desired actions. Alternatively, the packet may also be sent to a central processing unit (CPU) for processing by software and re-sent back to the network component. Thus, the switch may have to undergo an expensive complete chip production cycle from redesign, synthesis, validation and a new testing process in to add the additional features. In the case of software based modifications, this technique may severely impact the performance of the chip in processing that particular packet.

As the demand for higher speed and lower cost network components increases, so does the demand for an innovative system to meet such demand. Accordingly, a programmable field replacement action processing logic for a network component is important since it can benefit the communication network environment.

SUMMARY OF THE INVENTION

According to an embodiment of the present invention, provided is a method of processing a packet in a communication network. The method includes the steps of determining an initial bit position value within the packet and identifying a bit action value. The method also includes the step of calculating an extracted bit value based upon the initial bit position value and the bit action length value. The method also includes the step of implementing at least one action on a packet by using an action bit value to modify the extracted bit value.

According to another embodiment of the present invention, provided is a network component for processing a packet. The network component includes at least one first storage unit, at least one second storage unit, at least one third storage unit, and an action implementation unit. The at least one first storage unit is configured to store an initial bit value selected from within the packet. The at least one second storage unit is configured to store a bit action length value. The at least one third storage unit is configured to store an extracted bit value based upon the initial bit value and the bit action length value. The action implementation unit is configured to implement at least one action on a packet by using an action bit value to modify the extracted bit value.

According to another embodiment of the present invention, provided is a system for processing a packet in a communication network. The system includes a means for determining an initial bit value and a means for identifying a bit action value. The system also includes a means for calculating an extracted bit value based upon the initial bit position value and the bit action length value. The system also includes a means for implementing at least one action on a packet by using an action bit value to modify the extracted bit value.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
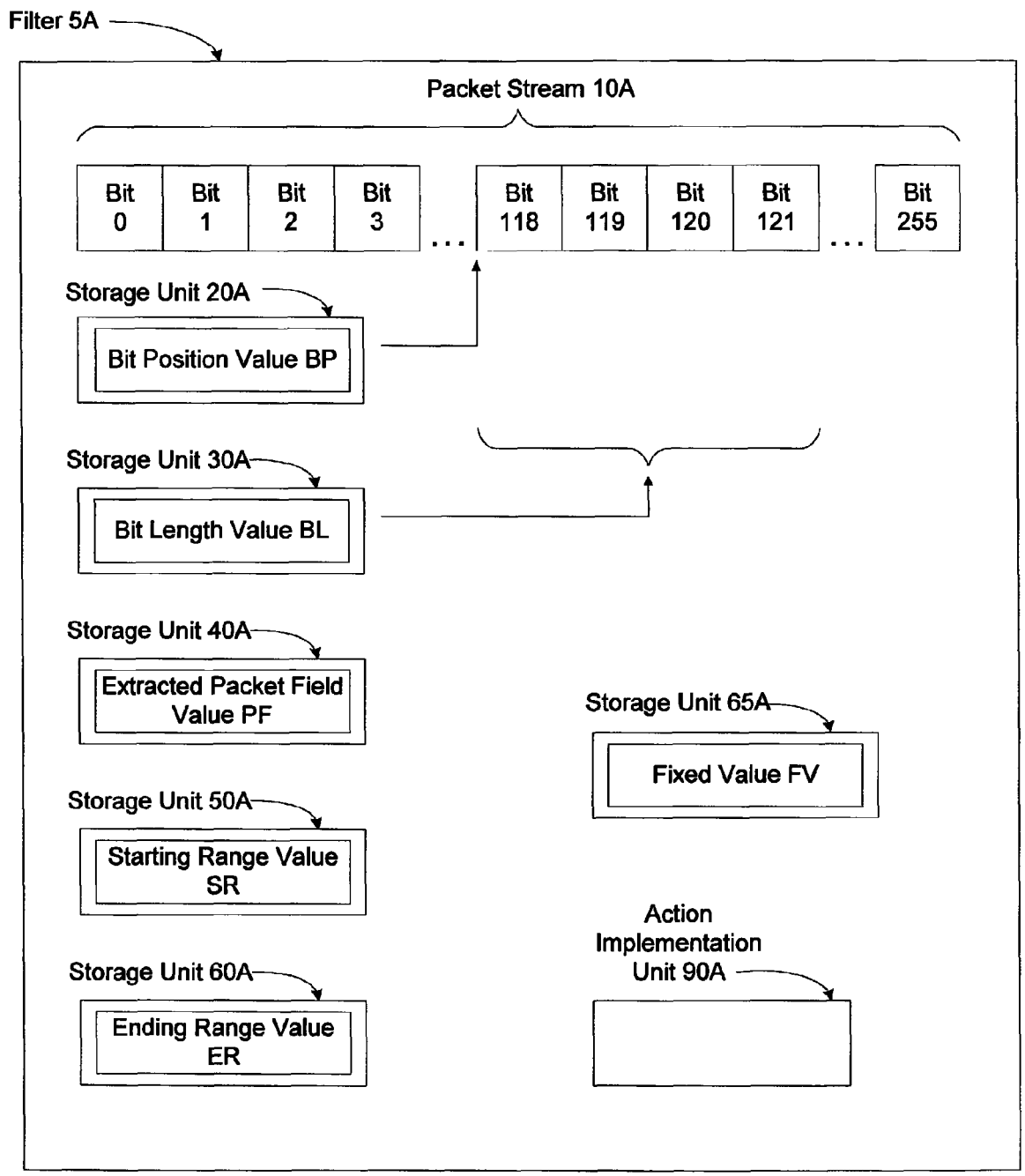
FIG. 1 illustrates one example of a configuration for filtering a packet, which may be implemented in the invention.

FIG. 1 illustrates one example of a hardware configuration that can perform packet filtering programmable packet field replacement based on a range technique, in accordance with the system and method of the invention. The example shown in FIG. 1 illustrates a fast flexible range checking technique. The performance of packet filtering can also be referred to as packet classification. Therefore, the hardware configurations and examples provided herein can also perform packet classification.

In addition, the hardware configuration of FIG. 1 can be in an integrated, modular and single chip solution, and therefore can be embodied on a semiconductor substrate, such as silicon. Alternatively, the hardware configuration of FIG. 1 can be a plurality of discrete components on a circuit board.

FIG. 1 shows a filter 5A that can have at least one packet stream 10A, and a plurality of storage units 20A, 30A, 40A, 50A and 60A. The packet stream 10A, for example, can include 256 bits wherein each bit represents a bit value. It is noted that although the packet stream 10A is provided in FIG. 1, filter 5A can process data in any data format, including but not limited to a data packet, a data frame, or a data cell.

Filter 5A as shown in FIG. 1 can include at least five storage units 20A, 30A, 40A, 50A and 60A wherein each storage unit 20A, 30A, 40A, 50A and 60A can be any memory storage unit, such as a register. Each storage unit 20A, 30A, 40A, 50A and 60A can store programmable values or information therein, and can be of any width or bit length.

Storage unit 20A of FIG. 1 can be a register for storing a position value in a bit stream. The position value in the bit stream is termed as bit position value BP and can be a programmable value that can identify or represent a predetermined bit position within a packet stream 10A. Therefore, the bit position value BP can be a value that represents the starting bit position of a particular packet field or a particular packet section within a packet stream 10A, to be extracted therefrom. For example, the bit position value BP can be a predetermined programmable binary value equivalent to decimal value 118 which can identify or represent the starting bit position 118 within the 256 bits of packet stream 10A.

In addition, storage unit 30A of FIG. 1 can also be a register for storing a bit length value BL. The bit length value BL can be a programmable value that identifies or represent a predetermined bit length of a packet field within a packet stream 10A. In other words, the bit length value BL represents a number of bits to be extracted from a packet stream 10A. The bit length value BL can be any value, such as from zero to the value required to indicate the maximum number of bits in the packet stream 10A. In other words, the bit length value BL can be a value that represents a number of bits from the starting bit position of a packet field to be extracted from a packet stream 10A. For example, the bit length value BL can be a predetermined programmable binary value equivalent to decimal value 4. A bit length value BL of 4 can identify or represent a number of bits from the starting bit position 118 within a packet stream 10A, for extraction. As such, a bit position value BP of 118, and a bit length value BL of 4 can extract a packet field of bits 118, 119, 120 and 121 within a packet stream 10A.

Storage unit 40A of FIG. 1 can be a register for storing a temporary value or information, such as an extracted packet field value PF. The extracted packet field value PF can be a binary value or can be in any value format. In addition, the extracted packet field value PF can be a value identifying or representing the value associated with a packet field extracted from a packet stream 10A. For instance, the storage unit 20A can store a bit position value BP which represents a starting bit position within a packet stream 10A. Also, the storage unit 30A can store a bit length value BL, which can represent a number of bits with respect to a packet field to be extracted from the packet stream 10A. Accordingly, the BP and BL values or information stored in storage units 20A and 30A, respectively, can identify a starting bit position and an ending position of a packet field to be extracted from the packet stream 10A. In other words, the bit position BP identifies the starting bit position of a packet field within a packet stream 10A. Therefore, the ending position of the field packet can be the sum of the bit position value BP and the bit length value BL. Once the starting bit position and the ending position are identified, the packet field can be extracted from the packet stream 10A. Once the packet field is extracted, an extracted packet field value PF can be determined, and the extracted packet field value PF can thereafter be stored in storage unit 40A.

Further shown in FIG. 1 is a storage unit 50A configured to store one range value out of a plurality of range values. For example, the storage unit 50A can store a starting range value SR out of a plurality of range values. The storage unit 50A can be a register for storing a starting range value SR. The starting range value SR can be a binary value or a value of any format. Furthermore, the starting range value SR can be a programmable value that can identify or represent a predetermined lower boundary value of a range of values. Therefore, the starting range value SR can identify or represent a lower boundary value of a range of values that the extracted packet field value PF can be compared with or checked against.

Similarly shown in FIG. 1 is a storage unit 60A configured to store another range value out of a plurality of range values. For example, the storage unit 60A can store an ending range value ER out of a plurality of range values. The storage unit 60A can also be a register for storing an ending range value ER. Like the starting range value SR, the ending range value ER can be a binary value or a value of any format. Furthermore, the ending range value ER can be a programmable value that can identify or represent a predetermined upper boundary value of a range of values. Therefore, the ending range value ER can identify or represent an upper boundary value of a range of values that the extracted packet field value PF can be compared with or checked against.

Accordingly, the storage unit 50A can store a starting range value SR which can specify or represent the lower boundary value of a plurality of range values, and the storage unit 60A can store an ending range value ER which can specify or represent the upper boundary value of the plurality of range values. In other words, the starting range value SR and the ending range value ER can identify or set a lower boundary and an upper boundary for a particular range of values. Once the boundaries of the range of values are identified, an extracted packet field value PF stored in the storage unit 40A can be compared with or checked against the range of values established by the starting range value SR and the ending range value ER.

Filter 5A as shown in FIG. 1 can also include a storage unit 65A wherein the storage unit 65A can be any memory storage unit, such as a register. The storage unit 65A can store at least a programmable value or information therein, and can be of any width or bit length. In another example, the storage unit 65 can store a predetermined programmable fixed value FV, wherein the fixed value FV can be any value. According, the system can also extract a packet field value PF stored in the storage unit 40A and can compare it with or check it against the fixed value FV to determine if there is a match. In other words, once a packet field value PF is determined, rather than or in addition to comparing the packet field value PF to a range of values established by the starting range value SR and the ending range value ER, the system can identify a fixed value FV within storage unit 65A and can compare the packet field value PF to the identified fixed value FV. Upon comparing the packet field value PF with the fixed value FV, the system can determine whether the packet field value PF is equal to the fixed value FV or whether there is a match between the packet field value PF and the fixed value FV. Furthermore, instead of providing a separate storage unit 65A for FV, the system may be configured to set the SR value equal to ER value and therefore it will implicitly imply a fixed value check. It is noted that the system can separately compare a packet field value PF with a range of values, or can separately compare a packet field value PF with a fixed value FV, or a combination thereof.

Figure 2:
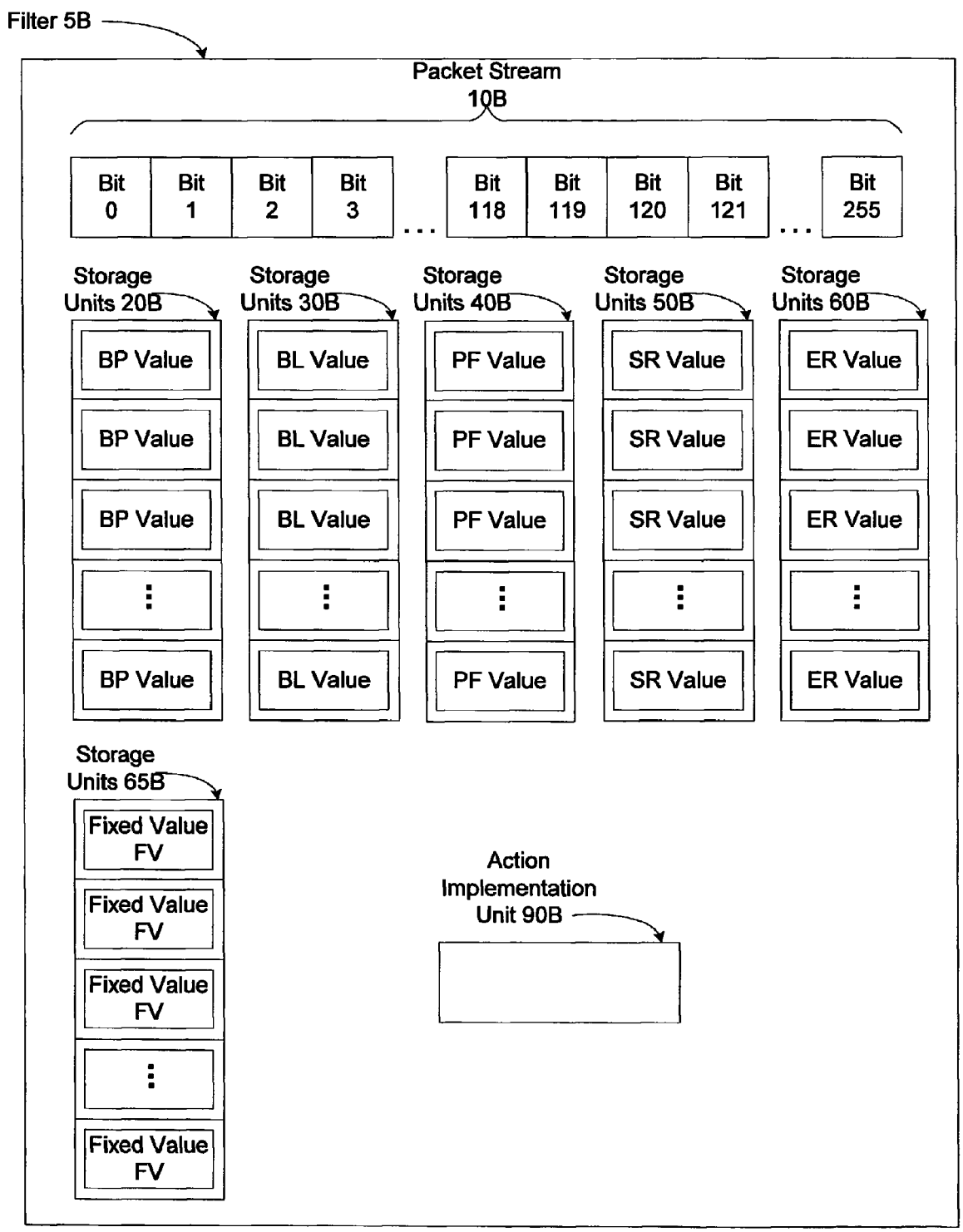
FIG. 2 illustrates another example of a configuration for filtering a packet, which may be implemented in the invention.

FIG. 2 shows another example of a hardware configuration that can perform packet filtering based on a range technique. The example shown in FIG. 2 illustrates a fast flexible range checking technique. The hardware configuration of FIG. 2 can be in an integrated, modular and single chip solution, and therefore can be embodied on a semiconductor substrate, such as silicon. Alternatively, the hardware configuration of FIG. 2 can be a plurality of discrete components on a circuit board.

FIG. 2 shows a filter 5B that can have at least one packet stream 10, and a plurality of storage units 20B, 30B, 40B, 50B and 60B. The packet stream 10B, for example, can include 256 bits wherein each bit represents a bit value. As noted above, filter 5B of FIG. 2 can process data in any data format, including but not limited to a data packet, a data frame, or a data cell.

Filter 5B as shown in FIG. 2 can include a plurality of six storage units 20B, 30B, 40B, 50B, 60B and 65B wherein each storage unit 20B, 30B, 40B, 50B, 60B and 65B can be any memory storage unit, such as a register. The plurality of storage units 20B, 30B, 40B, 50B, 60B and 65B can store programmable values or information therein, and can be of any width or bit length. Furthermore, each storage unit of the plurality of storage units 20B, 30B, 40B, 50B, 60B and 65B can be configured to function as discussed above with respect to the storage units 20A, 30A, 40A, 50A, 60A and 65A of FIG. 1. In other words, FIG. 2 can include a plurality of storage units 20B, a plurality of storage units 30B, a plurality of storage units 40B, a plurality of storage units 50B, a plurality of storage units 60B and a plurality of storage units 65B. Accordingly, FIG. 1 illustrates one set of range checking registers having one set of range checking values, BP, BL, PF, SR, ER and FV for implementing one range checking operation on one packet field. In the alternative, FIG. 2 illustrates multiple sets of range checking registers having multiple sets of range checking values BP, BL, PF, SR, ER and FV for implementing a plurality of range checking operations on a plurality of packet fields. The plurality of range checking operations on a plurality of packet fields can occur in parallel because the plurality of storage units 20B, 30B, 40B, 50B, 60B and 65B can store a plurality of values for range checking on an incoming packet stream 10B.

Figure 3:
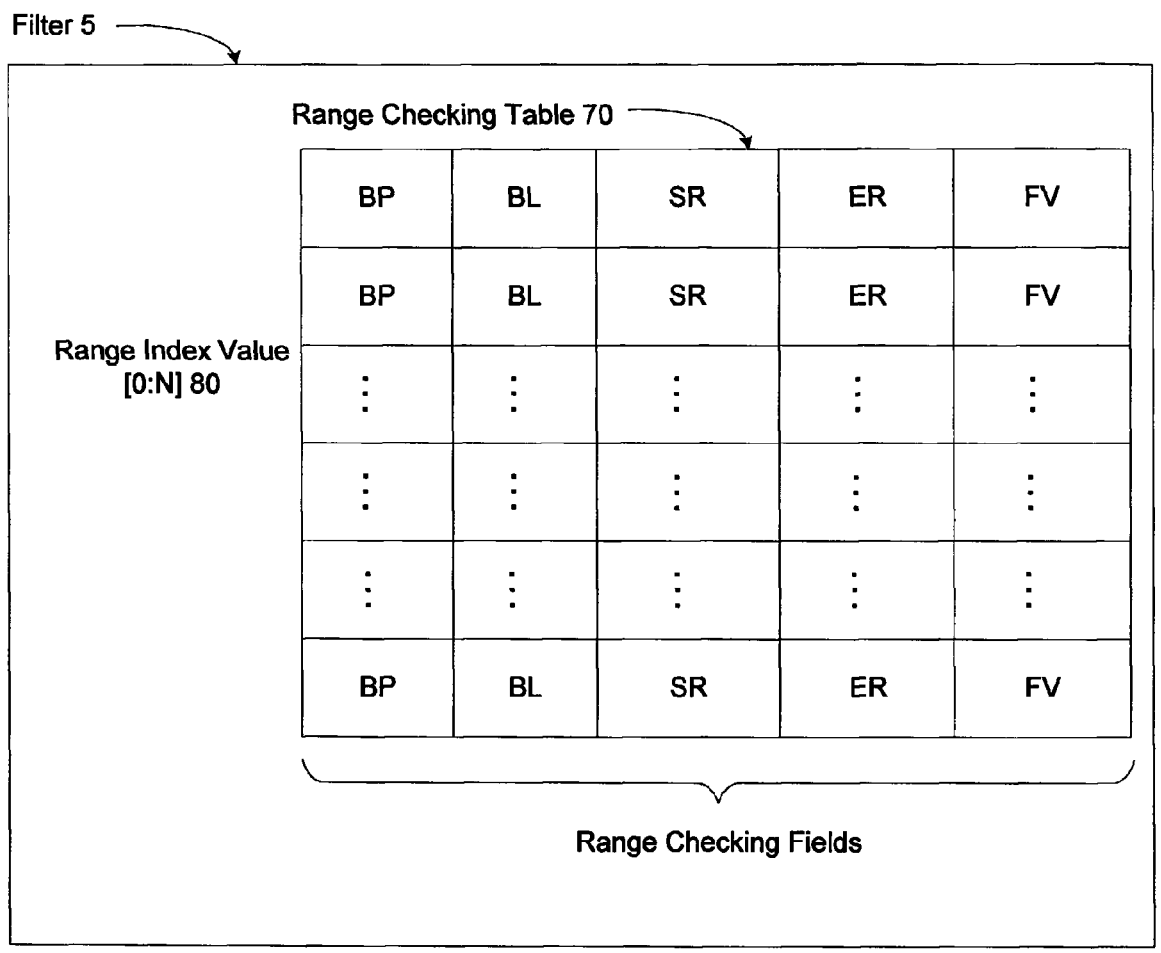
FIG. 3 illustrates one example of a range checking table for filtering a packet, which may be implemented in the invention.

FIG. 3 shows another example of a hardware configuration that can perform packet filtering based on fast flexible range checking. The hardware configuration of FIG. 3 can be in an integrated, modular and single chip solution, and therefore can be embodied on a semiconductor substrate, such as silicon. Alternatively, the hardware configuration of FIG. 3 can be a plurality of discrete components on a circuit board.

FIG. 3 illustrates a range checking table 70 that can be configured to table a plurality of storage units. In this embodiment, each storage unit within the range checking table 70 can be a separate and individual storage location or field of the range checking table 70 for storing the range checking fields, such as a bit position value BP, a bit length value BL, a starting range value SR and an ending range value ER, and a fixed value FV. FIG. 3 further shows a range index value 80 that can be generated after a packet stream is parsed or masked. Upon generating the range index value 80, the range index value 80 can be applied or indexed to the range checking table 70 to access and identify the range checking fields therein.

Figure 4:
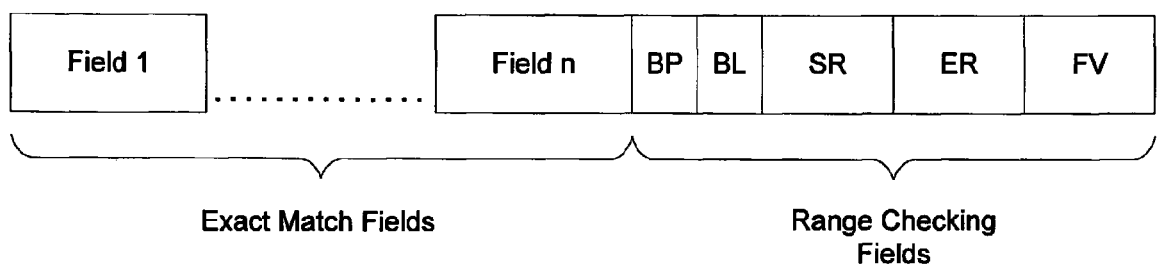
FIG. 4 illustrates another example of a configuration for filtering a packet, which may be implemented in the invention.

FIG. 4 shows yet another example of a hardware configuration that can perform packet filtering based on fast flexible range checking. The hardware configuration of FIG. 4 can be in an integrated, modular and single chip solution, and therefore can be embodied on a semiconductor substrate, such as silicon. Alternatively, the hardware configuration of FIG. 4 can be a plurality of discrete components on a circuit board.

FIG. 4 illustrates a string of registers indicated as fields 1-$n$. The string of registers includes a plurality of exact match registers for multi-field exact match checking, and a plurality of registers for range checking. The plurality of exact match registers can store exact match fields for implementing multi-field exact match checking. In addition, the plurality of range checking registers can store range checking fields for implementing range checking as discussed herein. In other words, FIG. 4 shows an example whereby a set of range checking fields can be configured as a set of extension registers added to the exact match registers.

Figure 5:
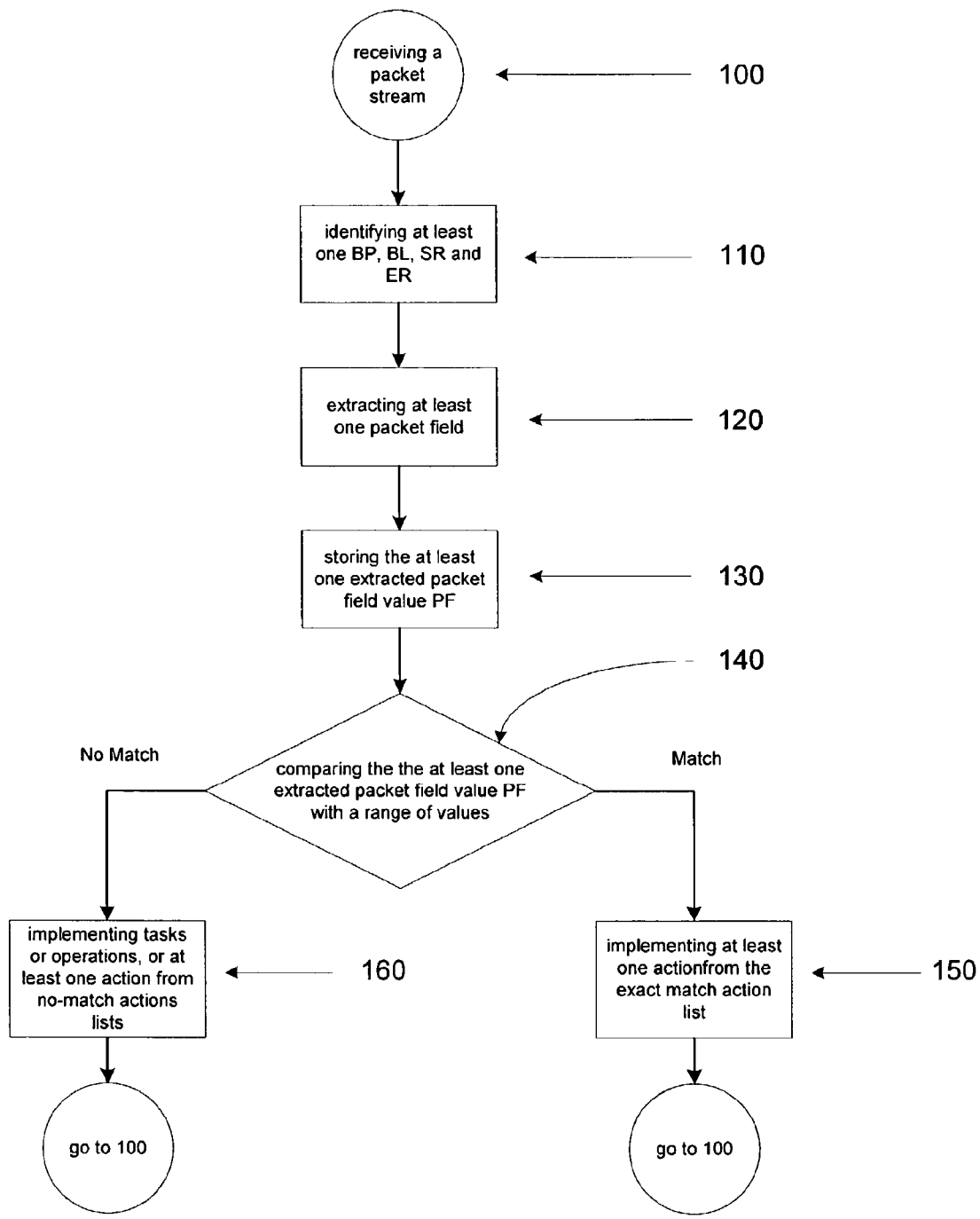
FIG. 5 illustrates a flow chart illustrating one example of a method of filtering a packet, which may be implemented in the invention.

FIG. 5 illustrates one example of a method of filtering incoming packets. The method can be implemented in hardware, or software, or a combination of both hardware and software.

An ingress port in a network device can receive at least one packet stream 10A therein. A packet stream 10A can be of any length. In this example, the packet stream 10A can be a bit length of 256 bits starting at bit 0 and ending at bit 255, as shown in FIG. 1. Accordingly, step 100 of FIG. 5 can receive a packet stream in an ingress port of a network device.

As mentioned above, a filter 5A can include a plurality of storage units, such as storage units 20A, 30A, 40A, 50A and 60A, or include multiple sets of a plurality of storage units 20A, 30A, 40A, 50A and 60A. In this example, the storage units can be a plurality of registers and can store values or information therein, or multiple sets of values or information therein. As for storage units 20A, 30A, 50A and 60A, each storage unit thereof can store preprogrammed values therein. Accordingly, step 110 of FIG. 5 can identify at least four separate values stored in at least four separate storage units, respectively. Step 110 identifies at least one bit position value BP stored in storage unit 20A, identifies at least one bit length value BL stored in storage unit 30A, identifies at least one starting range value SR stored in storage unit 50A, and identifies at least one ending range value ER stored in storage unit 60A.

Having identified the at least one bit position value BP and at least one bit length value BL from step 110, the process at step 120 can extract at least one packet field from the packet stream 10A based on the information corresponding to the bit position value BP and the bit length value BL. For example, suppose the at least one storage unit 20A can store a preprogrammed decimal bit position value of 118; and suppose the at least one storage unit 30A can store a preprogrammed decimal bit length value of 16. Step 110 of FIG. 5 therefore can identify these two values BP and BL; and with these two values, step 120 can extract a packet field of 16 bits in length starting at bit position 118 within packet stream 10A.

Upon extracting at least one packet field at step 120 of FIG. 5, at least one extracted packet field value PF can be determined based on the at least one extracted packet field, and the at least one extracted packet field value PF can be temporarily stored in storage unit 40A in step 130. For example, suppose the at least one extracted packet field is determined to have an extracted packet field decimal value of 68. This decimal value of 68 can be temporarily stored in storage unit 40A at step 130.

As mentioned above, at step 110, the process can identify at least one starting range value SR and at least one ending range value ER. The at least one starting range value SR and the at least one ending range value ER can therefore identify a lower boundary value and an upper boundary value of a set of range of values. At step 140, the process can compare at least one extracted packet field value PF with or against at least one set of range of values set by the starting range value SR and by an ending range value ER. For instance, suppose at least one storage unit 50A can store a preprogrammed decimal starting range value of 60; and suppose at least one storage unit 60A can store a preprogrammed decimal ending range value of 80. Accordingly, the at least one set of range of values is set by a lower boundary 60 and an upper boundary 80. Step 140 of FIG. 5 can therefore compare an extracted packet field decimal value PF of 68 temporarily stored within storage unit 40A with or against the range of values between 60 and 80.

Upon comparing at least one extracted packet field value PF with or against at least one set of range of values set by a starting range value SR and with an ending range value ER, step 140 can further decide whether the at least one extracted packet field value PF is either within the at least one set of range of values, including the starting and ending range values SR and ER, or whether the at least one extracted packet value PF is outside the at least one set of range of values. If the at least one extracted packet field value PF is within the at least one set of range of values, then process determines that there is a match. However, if the at least one extracted packet field value PF is outside the at least one set of range of values, then the process determines that there is no match.

If the at least one extracted packet field value PF is within the at least one set of range of values set by the starting range value SR and the ending range value ER, then the process can proceed to step 150 where an action implementation unit 90A can implement at least one action from a plurality of possible exact match actions with respect to the packet stream 10. If however the at least one extracted packet field value 45 is outside the at least one set of range of values, then the process can proceed to step 160 where a plurality of tasks or operations or at least one action from a plurality of possible no-match actions can be implemented or performed on the packet stream 10.

Therefore, upon comparing the extracted packet field value PF of 68 with or against the range of values from 60 to 80, including the lower boundary value of 60 and including the upper boundary of 80, step 140 can determine that the extracted packet field value of 68 is within the range of values between 60 through 80, and therefore it is determined that there is a match. Since there is a match, step 150 of the process can implement at least one action from a plurality of possible exact match actions with respect to the packet stream 10A. In the alternative, suppose the extracted packet field value PF is 49 rather than the value 68. Then step 140 can determine that the extracted packet field value PF of 49 is outside the range of values between 60 through 80, and therefore it is determined that there is no match. Upon this determination, the process proceeds to step 160 and can perform a plurality of tasks or at least one action from a plurality of possible no-match actions with respect to the packet stream 10.

It is noted that the specific examples provided herein are examples of the present invention, and is not provided to limit the scope and nature thereof in any manner or way.

Figure 6:
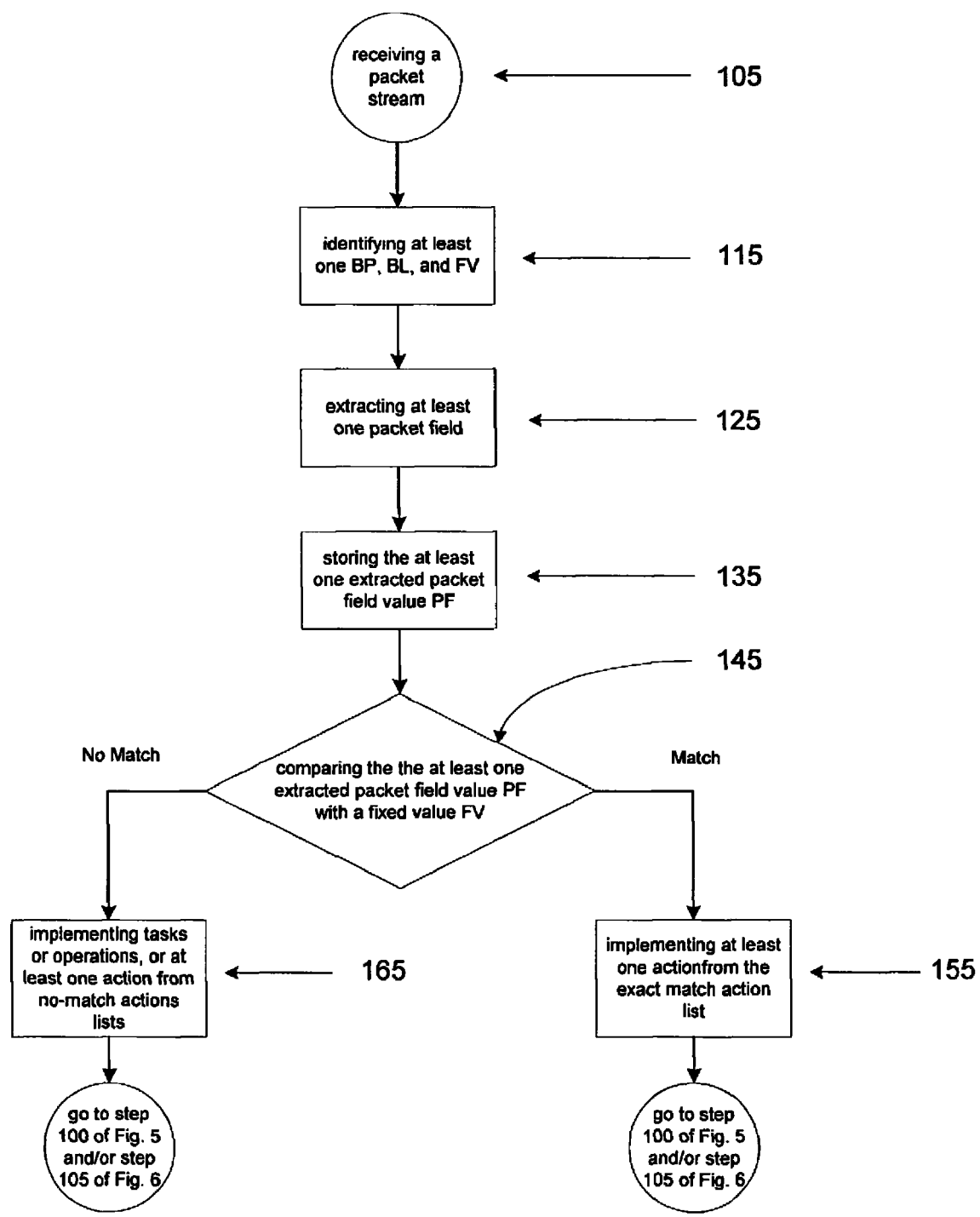
FIG. 6 illustrates another flow chart illustrating another example of a method of filtering a packet, which may be implemented in the invention.

FIG. 6 illustrates another example of a method of filtering incoming packets. The method of this example can be implemented in hardware, or software, or a combination of both hardware and software.

Step 105 of FIG. 6 can receive a packet stream 10 in an ingress port of a network device. The packet stream 10A can be of any length. In this example, the packet stream 10A can be a bit length of 256 bits starting at bit 0 and ending at bit 255, as shown in FIG. 1.

As mentioned above, a filter 5 can also include a plurality of storage units, such as storage units 20A, 30A, 40A, and 65A, or include multiple sets of a plurality of storage units 65B. In this example, the storage units can be a plurality of registers and can store values or information therein, or multiple sets of values or information therein. As for storage units 20A, 30A and 65A, each storage unit thereof can store preprogrammed values therein. Accordingly, step 115 of FIG. 6 can identify at least three separate values stored in at least three separate storage units, respectively. Step 115 identifies at least one bit position value BP stored in storage unit 20A, identifies at least one bit length value BL stored in storage unit 30A, identifies at least one fixed value FV stored in storage unit 60A.

Having identified the at least one bit position value BP and at least one bit length value BL from step 115, the process at step 125 can extract at least one packet field from the packet stream 10A based on the information corresponding to the bit position value BP and the bit length value BL. For example, suppose the at least one storage unit 20 can store a preprogrammed decimal bit position value of 118; and suppose the at least one storage unit 30A can store a preprogrammed decimal bit length value of 16. Step 115 of FIG. 6 therefore can identify these two values BP and BL; and with these two values, step 125 can extract a packet field of 16 bits in length starting at bit position 118 within packet stream 10.

Upon extracting at least one packet field at step 125 of FIG. 6, at least one extracted packet field value PF can be determined based on the at least one extracted packet field, and the at least one extracted packet field value PF can be temporarily stored in storage unit 40A in step 135. For example, suppose the at least one extracted packet field is determined to have an extracted packet field decimal value of 68. This decimal value of 68 can be temporarily stored in storage unit 40 at step 135.

As mentioned above, at step 115, the process can identify at least one fixed value FV stored within storage unit 65. At step 145, the process can compare at least one extracted packet field value PF with or against at least one fixed value FV. For instance, suppose the at least one fixed value FV has a fixed value of 68, then step 145 of FIG. 6 can therefore compare an extracted packet field decimal value PF of 68 temporarily stored within storage unit 40 with or against the fixed value of 68.

Upon comparing at least one extracted packet field value PF with or against at least one fixed value FV, step 145 can further decide whether the at least one extracted packet field value PF is either equal to the at least one fixed value FV, thereby having a match, or whether the at least one extracted packet value PF is not equal to the at least one fixed value FV, thereby having a no-match. If the at least one extracted packet field value PF is equal to the at least one fixed value FV, then the process determines that there is a match. However, if the at least one extracted packet field value PF is not equal to the at least one fixed value FV, then the process determines that there is no match.

If the at least one extracted packet field value PF is equal to the at least one fixed value FV, then the process can proceed to step 155 where an action implementation unit 90A can implement at least one action from a plurality of possible exact match actions with respect to the packet stream 10A. If however the at least one extracted packet field value 45 is not equal to the at least one fixed value FV, then the process can proceed to step 165 where a plurality of tasks or operations or at least one action from a plurality of possible no-match actions can be implemented or performed on the packet stream 10A.

It is noted that the examples provided in FIGS. 5 and 6 can be separately implemented or can be implemented together or in any combination thereof.

Figure 7:
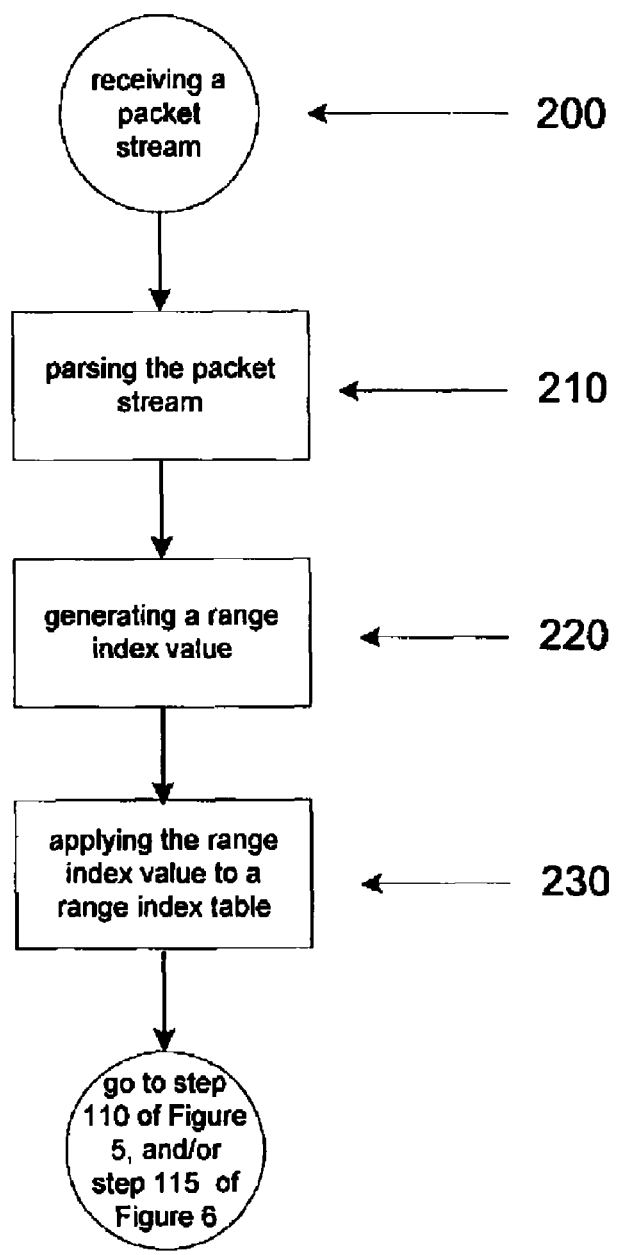
FIG. 7 illustrates another flow chart illustrating another example of a method of filtering a packet, which may be implemented in the invention.

FIG. 7 illustrates another example of a method of filtering incoming packets. The method of this example can be implemented in hardware, or software, or a combination of both hardware and software.

Step 200 of FIG. 7 can receive a packet stream 10A in a filter 5, and the packet stream 10A can be of any length. In this example, the packet stream 10 can be a bit length of 256 bits starting from bit 0 and ending at bit 255.

Upon receiving the packet stream 10A, the process at step 210 can parse the packet stream based on preprogrammed instructions. Afterwards, step 220 can generate a range index value 80. The range index value 80 can be a binary value or can be of any value format. Once the range index value 80 is generated, then the process at step 230 can apply or index the range index value 80 to a range checking table 70 wherein the range checking table 70 can include a plurality of range checking fields, such as bit position value BP, bit length value BL, starting range value SR and ending range value ER, and a fixed value FV. Upon applying or indexing the range index value 80 to the range checking table 70, the method step 110 of FIG. 5 can identify at least one bit position value BP, at least one bit length value BL, at least a starting range value SR and at least an ending range value ER within the range checking table 70. In addition or in the alternative, upon applying or indexing the range index value 80 to the range checking table 70, the method step 115 of FIG. 6 can identify at least one bit position value BP, at least one bit length value BL, and a fixed value FV within the range checking table 70. Thereafter, FIG. 7 follows the method steps as discussed above with respect to range checking steps 120, 130, 140, 150 and 160 of FIG. 5, and/or steps 125, 135, 145, 155 and 165 of FIG. 6.

Although the system and method have been described based upon an exact match, the fast flexible range checking technique may also be designed to determine a partial match, where some of the bits match the value stored in the at least one fixed value FV. If a partial match is determined, a predefined action may be implemented based upon the partial match.

The fast flexible range checking technique may be employed in determining pre-defined actions to be performed on the incoming packets. The network component may filter the incoming packet through a filter and then use a look-up table to search for an exact match or a partial match. If an exact match exists, then the pre-defined actions specified in the exact match action of that entry may be performed on the incoming packet. For packets not having an exact match, yet there is a partial match where some of the fields match, the pre-defined actions specified in the partial match action field may be applied to the incoming packet. For packets, which do not have an exact or partial match in the pre-defined look-up table, these packets may be dropped, a default action may be applied or the packet may be passed to the next stage without any actions for further processing.

In other words, whenever the system determines that there is an exact match or a partial matching using the fast flexible checking technique or any field replacement technique, a pre-defined action may be assigned to correspond to each exact match or partial match.

Thus, one aspect of the invention is to provide a fast filtering process based upon a field replacement technique. Another aspect of the invention is to provide a programmable packet field replacement action based on a range technique.

This range replacement technique may be employed in network devices where a customer wishes to add a new feature or functionality to its product, which is not currently defined within the pre-defined action tables.

Figure 8:
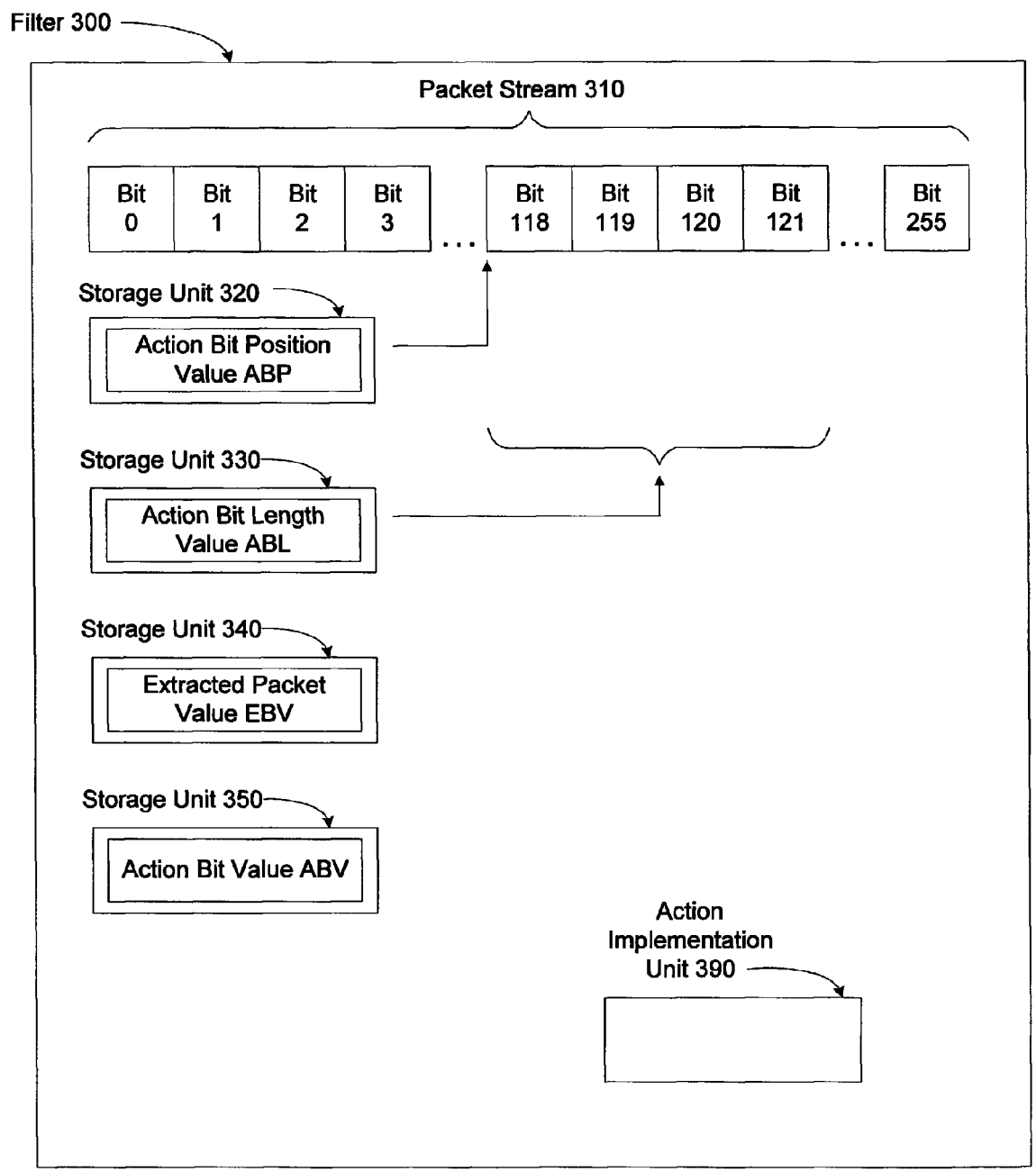
FIG. 8 illustrates another example of a configuration for filtering a packet, which may be implemented in the invention.

An example of the range replacement technique is shown in FIG. 8. Filter 300 as shown in FIG. 8 can include at least five storage units 320, 330, 340, and 350 wherein each storage unit 320, 330, 340, and 350 can be any memory storage unit, such as a register. Each storage unit 320, 330, 340, and 350 can store programmable values or information therein, and can be of any width or bit length.

Storage unit 320 of FIG. 8 can be a register for storing a position value in a bit stream. The position value in the bit stream is termed as an action bit position value ABP and can be a programmable value that can identify or represent a predetermined bit position within a packet stream 310. Therefore, the action bit position value ABP can be a value that represents a starting bit position within a packet stream 310.

In addition, storage unit 330 of FIG. 8 can also be a register for storing an action bit length value ABL. The action bit length value ABL can be a programmable value that identifies or specifies the number of bits to be processed within a packet stream 310 starting from the position specified in the action bit position value ABP. In other words, the action bit length value ABL represents a number of bits to be extracted from a packet stream 310. The action bit length value ABL can be any value, such as from zero to the value required to indicate the maximum number of bits in the packet stream 310. The action bit length value ABL can be a value that represents a number of bits from the action bit position ABP of a packet to the last bit position of a range of bits to be extracted from a packet stream 310.

Storage unit 340 of FIG. 8 can be a register for storing a temporary value or information, such as an extracted packet value EPV. The extracted packet value EPV can be a binary value or can be in any value format. In addition, the extracted packet value EPV can be a value identifying or representing the value associated with a number of bits indicating a range of bits to be extracted from a packet stream 310. For instance, the storage unit 320 can store an action bit position value ABP which represents a starting bit position within a packet stream 310. Also, the storage unit 330 can store an action bit length value ABL, which can represent the length of the number of bits to be extracted from the packet stream 310. Accordingly, the ABP and ABL values or information stored in storage units 320 and 330, respectively, can identify a starting bit position and an ending position of a range of bits to be extracted from the packet stream 310. In other words, the bit position ABP identifies the starting bit position within a packet stream 310. Therefore, the ending position of the range can be the sum of the action bit position value ABP and the action bit length value ABL. Once the starting bit position and the ending position are identified for the range of the replacement bits, the replacement bits can be extracted from the packet stream 310. Once the replacement bits are extracted, an extracted bit value EBV can be determined, and the extracted bit value EBV can thereafter be stored in storage unit 340.

Further shown in FIG. 8 is a storage unit 350 configured to store an action bit value ABV. The action bit value ABV can be a programmable value that can be used for specifying an action to be performed on a packet stream 310. The action bit value ABV can be a value used to modify the extracted bit value EBV in order to perform an action on a packet stream 310. The action bit value ABV may be programmed as a replacement bit, which may be a bit value that is inserted in place of the extracted bit value within a packet stream 310.

Alternatively or conjunctively, the action bit value ABV may be programmed as an algorithm that modifies the extracted bit value by applying a mathematical function to the extracted bit value EBV. Then, an action implementation unit 390, as shown in FIG. 8, can implement at least one action upon the packet stream 310.

The action bit value ABV may be programmed as an algorithm, an encryption key or a mathematical functions that performs a mathematical operation on the extracted bit value EBV to generate a modified extracted bit value EBV. The modified extracted bit value EBV may then be inserted into packet 310 to replace the original extracted bit value EBV. This feature, for example, may use an encryption algorithm to modify a public key used in secured transactions. The public key may be stored in the action bit value ABV. Thus, the hardware may use action bit value ABV as a public key to dynamically modify the extracted bit value EBV to generate a new value that encodes the packet 310 at wire speed rate. This feature may be particularly beneficial in applications such as wireless transactions or other secure transactions. The invention may be employed in a secured transactions to dynamically encode or encrypt the data for providing a highly secure packet transfer over the World Wide Internet.

The invention may also be further designed to operate based upon several assumptions. One such assumption is that an incoming packet may be parsed and formatted to a known format by an ingress logic unit (not shown) before the packet classification and filtering rules are applied. For example, an incoming Ethernet packets may be formatted to a standard Ethernet-II format. Parsing the packet to a known format may be used by the invention to determine the incoming packet's configuration. For example, a SNAP packet may include 8 additional bytes in comparison to an Ethernet II packet. If a customer wishes to configure its product to modify the VLAN ID of an incoming Ethernet packet and the VLAN ID of an incoming SNAP packet. The invention may be designed to locate the VLAN ID of the SNAP packet by performing a shift or offset process in comparison to an Ethernet format to add 8 additional bytes in order to locate the VLAN ID in the SNAP packet.

Another aspect of determining the known format of the incoming packet is that a customer may wish to change the format of the incoming packet from to another format. By employing the range replacement technique, the invention may be used to implement such a format change. The invention is designed to handle any type of packets. Therefore, it is not necessary, but merely optional, that the incoming packets be parsed and formatted to a known format.

The range replacement technique may be disabled by setting the action bit length ABL field value to zero and may be enabled by programming the action bit length ABL field value to be greater than zero. Alternatively, the invention may be designed to include a separate action enable AEN field attached to the set of ABP, ABL, and ABV register fields. Thus, the range replacement action may be disabled by setting AEN=0. However, by setting AEN=1, the invention may enable the range replacement actions.

After an action has been performed on an incoming packet, the invention may also be configured to determine whether the range replacement has had an impact on the integrity of the error correction or error detection fields of the packet. In order words, any modifications made to the packet, which may be detected as an error by an error detection or correction device, may need to be checked to ensure that such a change has not adversely affect the integrity of the packet.

The invention may enable different customers, using the same action fields to differentiate their products by programming the action bit value ABV with different packet field replacement options. Another feature provided by the invention is that new standards or protocols can be easily incorporated into a device, which employs the invention. For instance, a programmer can easily update a switch with a new standard or protocol by programming the action bit value ABV to perform an action, which implements the new standard or protocol, upon an incoming bit stream The invention may also be applied to any data which is based upon a bit concept. Thus, the invention provides a very flexible mechanism to update or replace existing protocols and/or standards.

Figure 9:
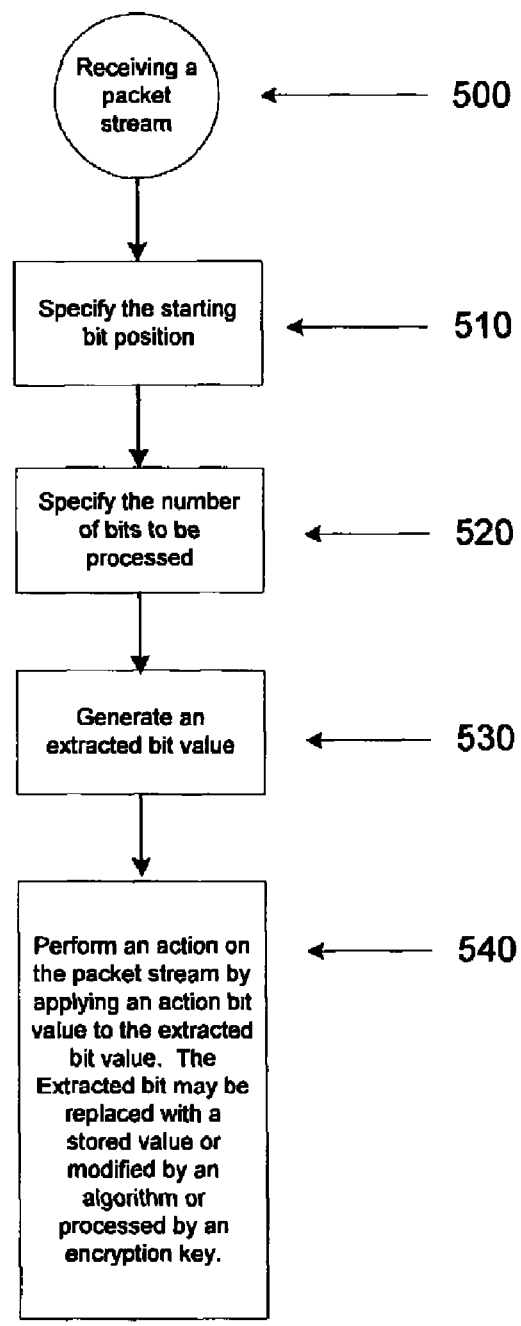
FIG. 9 illustrates another flow chart illustrating another example of a method of filtering a packet, which may be implemented in the invention.

FIG. 9 illustrates a method of filtering incoming packets in accordance with the present invention. The method of this example can be implemented in hardware, or software, or a combination of both hardware and software.

Step 500 of FIG. 9 can receive a packet stream 10 in an ingress port of a network device. The packet stream 10 can be of any length. Upon receiving the packet stream 10, step 510 can specify a starting bit position within the packet stream 10. Then, step 520 can specify the number of bits to be processed in the range replacement action starting from the position specified by the starting bit position. Afterwards, step 530 may generate an extracted bit value by adding the starting bit position and the number of bits to be processed. Step 540 may perform an action on the packet stream by using an action bit value to modify the extracted bit value. The extracted bit value may be replaced with a stored value. Alternatively, the extracted bit value may be modified by an algorithm or processed by an encryption key.

The range replacement technique may be used alternatively or conjunctively with any classification and filtering technique. For example, range replacement technique may be employed with the exact match and the partial match applications of the fast flexible range technique as discussed above. If an exact match is determined using the fast flexible range technique, the device may implement at least one action from the exact match action list, and optionally implement at least one range replacement action. If there is a partial match, the device may implement at least one action from the partial match action list and optionally implement at least one range replacement action. If there is no match according to the selected classification and filtering technique, the device may perform a default action or no action may be performed and the packet may be passed or may be dropped. Then, the next packet may be selected.

The above-disclosed configurations of the present invention can be in an integrated, modular, and single chip solution and can be embodied on a semiconductor substrate, such as silicon. Furthermore, the methods of filtering a packet as disclosed herein can be implemented in hardware, or software, or a combination of both hardware and software. Additionally, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of processing a packet in a communication network, said method comprising the steps of:
   determining an initial bit position value within the packet;
   identifying a bit action length value;
   calculating an extracted bit value based upon the initial bit position value and the bit action length value; and
   implementing at least one action on a packet by using an action bit value to modify the extracted bit value, wherein the step of implementing performs a replacement action.

2. The method of claim 1, wherein the step of implementing replaces the extracted bit value with the action bit value.

3. The method of claim 1, wherein the step of implementing performs an mathematical operation to modify the extracted bit value.

4. The method of claim 3, wherein the step of implementing uses an encryption key to modify the extracted bit value.

5. The method of claim 1, further comprising the step of determining a format of the packet.

6. The method of claim 5, wherein the step of implementing modifies the format of the packet using the action bit value to alter the extracted bit value.

7. A network component for processing a packet, said network component comprising:
   at least one first storage unit configured to store an initial bit value selected from within the packet;
   at least one second storage unit configured to store a bit action length value;
   at least one third storage unit configured to store an extracted bit value based upon the initial bit value and the bit action length value; and
   an action implementation unit configured to implement at least one action on a packet by using an action bit value to modify the extracted bit value, wherein the action implementation unit is configured to implement the at least one action by replacing the extracted bit value with the action bit value.

8. The network component of claim 7, wherein the action implementation unit is configured to implement the at least one action by using a mathematical operation to modify the extracted bit value.

9. The network component of claim 8, wherein the action implementation unit is configured to implement the at least one action by using an encryption technique to modify the extracted bit value.

10. A system for processing a packet in a communication network, said system comprising:
    a means for determining an initial bit position value within the packet;
    a means for identifying a bit action length value;
    a means for calculating an extracted bit value based upon the initial bit position value and the bit action length value; and
    a means for implementing at least one action on a packet by using an action bit value to modify the extracted bit value, wherein the means of implementing performs a replacement action.

11. A system for processing a packet in a communication network, said system comprising:
    a means for determining an initial bit position value within the packet;
    a means for identifying a bit action length value;
    a means for calculating an extracted bit value based upon the initial bit position value and the bit action length value; and
    a means for implementing at least one action on a packet by using an action bit value to modify the extracted bit value, wherein the means of implementing replaces the extracted bit value with the action bit value.

12. The system of claim 10, wherein the means of implementing performs an mathematical operation to modify the extracted bit value.

* * * * *